Dec. 28, 1954   O. H. LUDEMAN   2,698,157
ALTERNATE MANUAL AND AUTOMATICALLY OPERATED VALVE
Filed Nov. 23, 1951   4 Sheets-Sheet 1

INVENTOR.
OSCAR H. LUDEMAN
BY James G. Bethell
ATTORNEY

Dec. 28, 1954   O. H. LUDEMAN   2,698,157
ALTERNATE MANUAL AND AUTOMATICALLY OPERATED VALVE
Filed Nov. 23, 1951   4 Sheets-Sheet 2

INVENTOR.
OSCAR H. LUDEMAN
BY James G. Bethell
ATTORNEY

Dec. 28, 1954  O. H. LUDEMAN  2,698,157
ALTERNATE MANUAL AND AUTOMATICALLY OPERATED VALVE
Filed Nov. 23, 1951  4 Sheets-Sheet 3

INVENTOR.
OSCAR H. LUDEMAN
BY
ATTORNEY

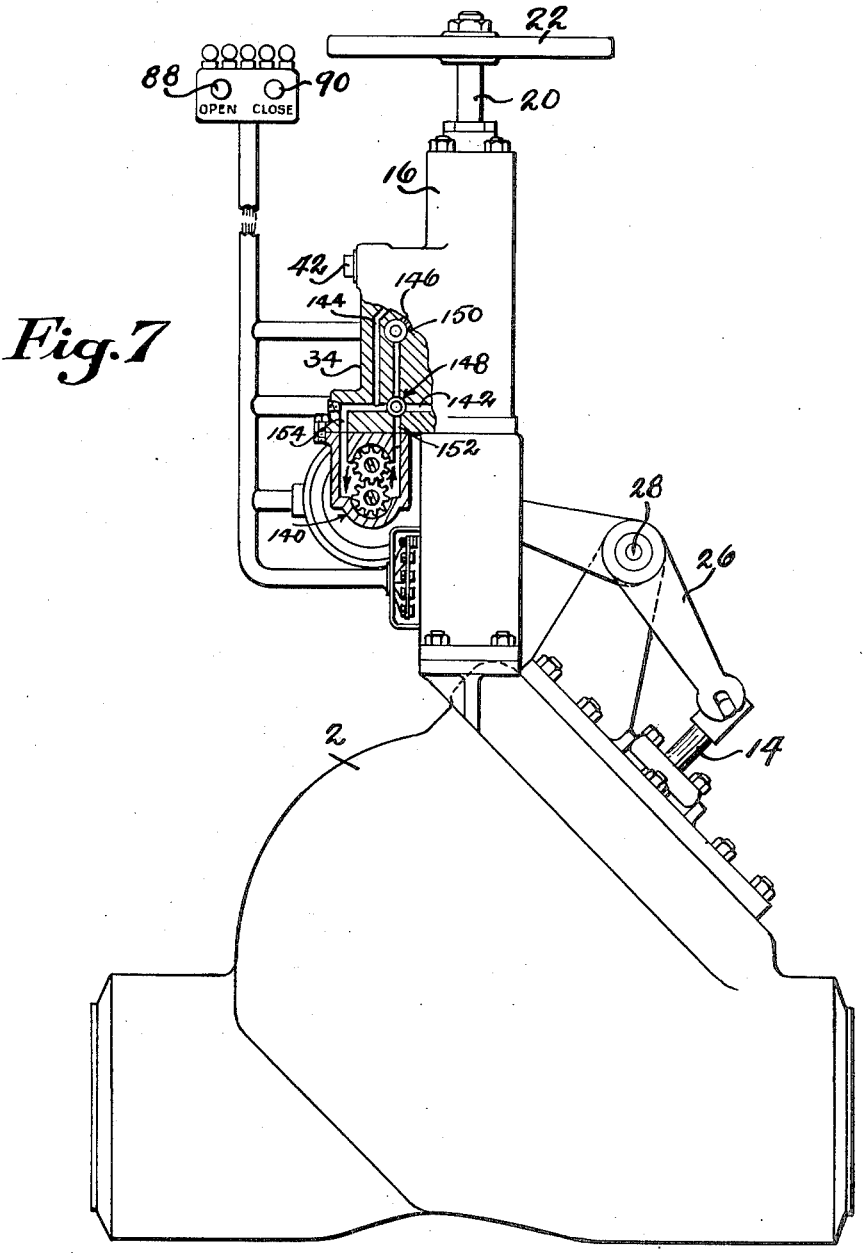

United States Patent Office 2,698,157
Patented Dec. 28, 1954

2,698,157

ALTERNATE MANUAL AND AUTOMATICALLY OPERATED VALVE

Oscar H. Ludeman, New York, N. Y.

Application November 23, 1951, Serial No. 257,787

4 Claims. (Cl. 251—14)

My invention is directed to an improvement in valves and has for an object to provide a valve which is operated either hydraulically or manually, either operation being permitted at all times without change or adjustment.

Electric control means of exceedingly simple construction is provided when actuating the valve hydraulically, which permits the valve to be operated either from a point adjacent the valve or from a point remote therefrom, this control also lending itself to the selective operation of a plurality of valves from a central point remote from the valves.

A further object of the invention is to provide a valve the operating mechanism of which is very simple in design as compared with conventional electrically operated valves. In my construction, for example in one embodiment of my invention, the only electric power required is for the control mechanism, which power may be taken from a lighting circuit, so that, should the control circuit be held closed after full opening or closing of the valve, no damage can ensue. In electrically operated valves, as distinguished from electrically controlled valves, the mechanism employed is complicated, and it is necessary to provide circuit breakers or other protection equipment to avoid damage to the installation in the event of a valve jam or other overload.

These inherent drawbacks are completely eliminated in my construction.

My improved construction provides for instant locking of the valve in full-open and full-closed position, as well as at any intermediate position desired.

Means are provided too whereby rate of opening and/or closing of the valve may be varied.

The valve operating medium is a pressure liquid, which may be taken from any suitable source, depending upon conditions and requirements at any given installation. In many instances, steam condensate will be used as the operating medium, which simply requires a condensate tank, to the top of which a small high pressure steam connection is made. In cases where exceptionally long runs of piping are required, it will be of advantage to use oil as the operating medium. This involves merely a tank and a pressure pump for maintaining the oil in the tank under pressure. Such equipment may be installed directly at the valve. In other instances I have provided for filling the operating system with oil initially, which normally is merely under atmospheric pressure, a small gear pump being mounted at the valve for placing this oil under pressure when the valve is to be operated.

In the accompanying drawings, wherein I have illustrated several embodiments of my invention, Fig. 1 is an elevational view of one embodiment of the invention;

Fig. 7 is a part-sectional elevational view of another embodiment of my invention.

Figure 1:
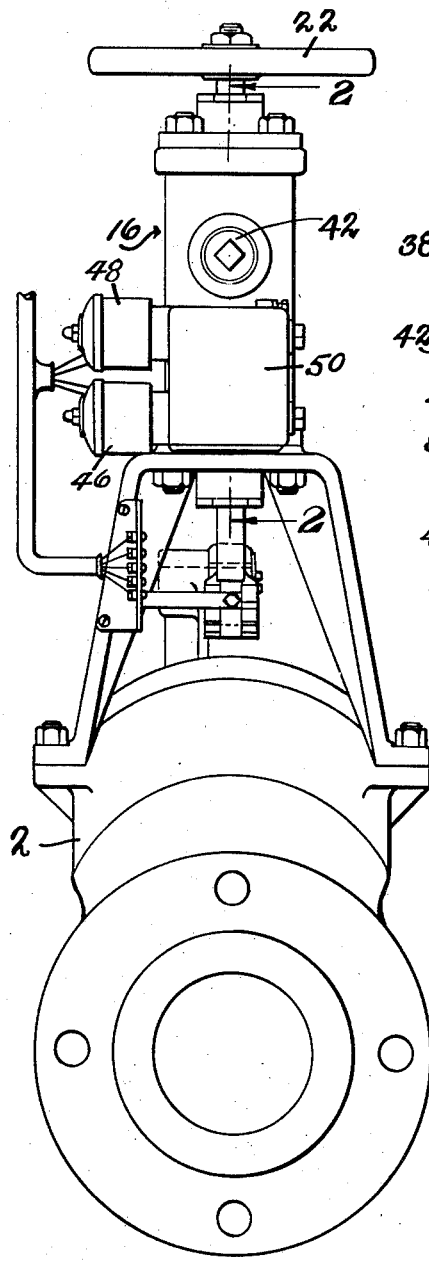

Referring to the drawings in detail and first of all to Figs. 1 to 4, both inclusive, of the drawings:

2 designates the valve body, 4 the valve seat therein, and 6 the main valve. The direction of steam flow has been indicated by arrows in Fig. 3, and it will be apparent that the valve closes in the direction of steam flow. The seat 4 is of Stellite or similar material, ground preferably to a 30° angle. When seated, the valve 6 is unbalanced in closing direction. It will be appreciated that this construction provides a steam-tight seating of the valve and avoids wedging or jamming and seat dragging or scoring.

The main valve 6 is ported at 12, this port cooperating with a by-pass valve 10. The primary function of this by-pass valve is to release the pressure on the upper side of the main valve 6 when the latter is to be opened, thus balancing the valve so as to facilitate opening of the same.

14 designates the valve stem, which carries the by-pass valve 10, but this stem is employed also as a means not only for opening and closing the by-pass valve but the main valve 6 as well.

Figure 3:
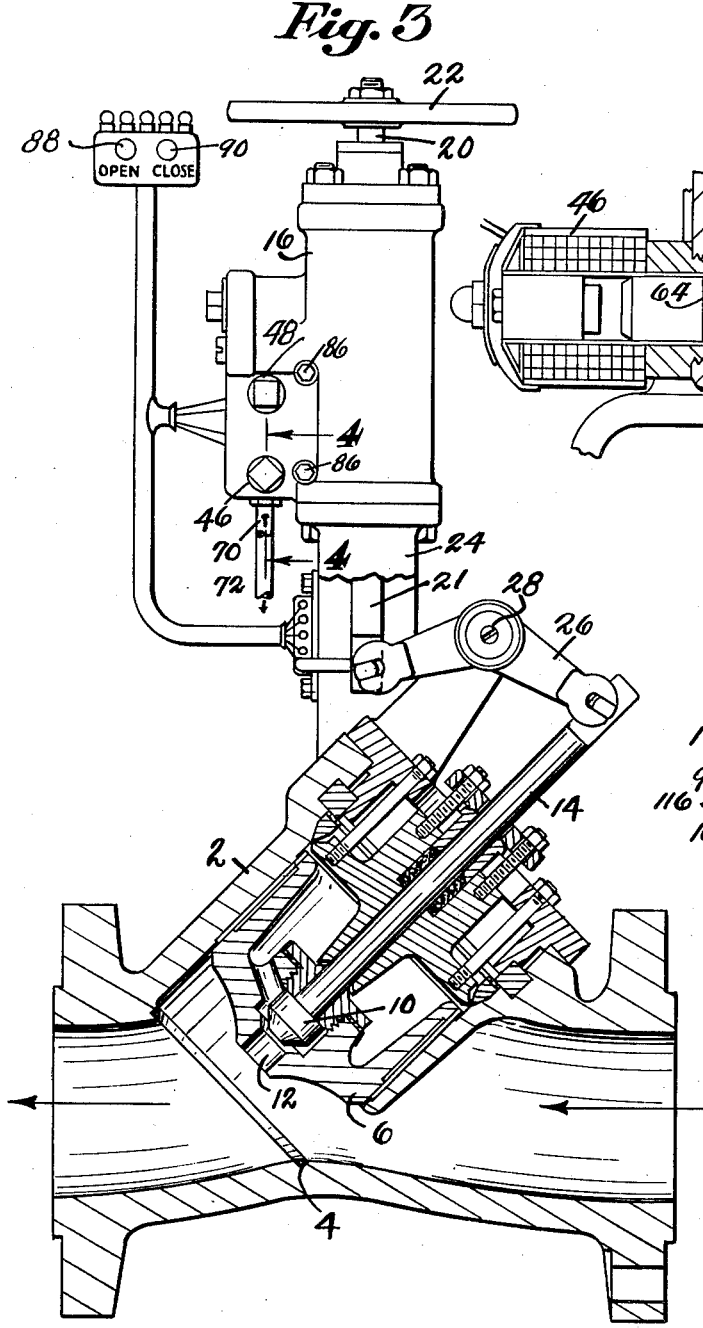
Fig. 3 is a side elevational view with the valve itself shown in section.

In Fig. 3 of the drawings, both the main valve 6 and the by-pass valve 10 are shown in open position. Under these conditions, of course, the valve 6 is balanced, so that, to close the main valve, it is merely necessary to push inwardly on the valve stem 14, closing the by-pass valve and the main valve. Inasmuch as the main valve 6 closes in the direction of steam flow, it will be appreciated, as above pointed out, that, with both the main valve and the by-pass valve seated, the main valve will be unbalanced in seating or seated direction due to pressure fluid passing the valve 6 via the restricted annular clearance between the valve and valve body. To open the main valve, the operation above described is reversed, an outward pull on the valve-operating stem 14 opening the by-pass valve 10, so that the main valve is again balanced, and further outward movement of the valve-operating stem opening the main valve.

As above pointed out, the main valve may be opened and closed manually, or it may be opened and closed hydraulically, and both procedures are always available without change or adjustment. In other words, one may push a button or turn a handwheel, just as desired, to operate the valve.

Figure 2:
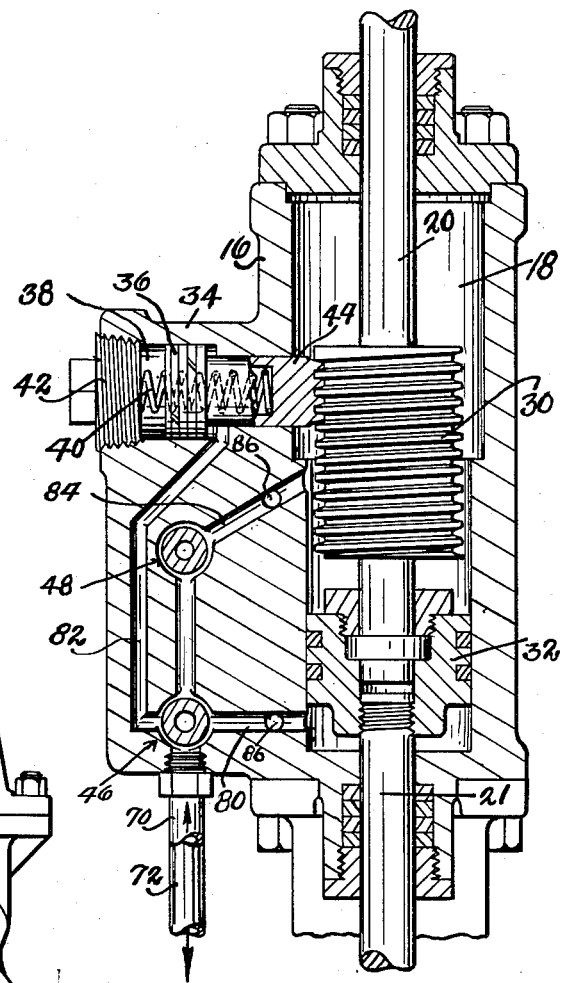
Fig. 2 is a section taken substantially on the line 2—2 of Fig. 1.
Figure 4:
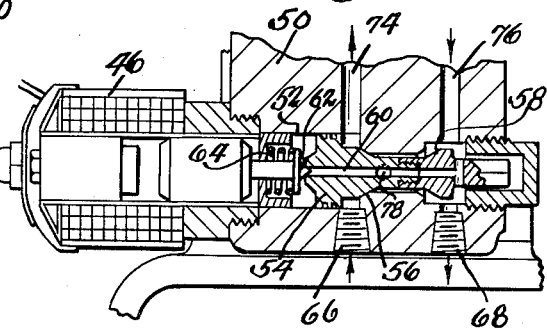
Fig. 4 is a fragmentary sectional view on the line 4—4 of Fig. 3.

Referring now more particularly to Figs. 2, 3, and 4 of the drawings:

The valve-operating and control mechanism illustrated in these figures of the drawings is conveniently mounted on the valve body 2 and comprises a casting 16, which stands to one side of the outer end of the valve body and at an angle thereto (a 45° angle has been shown for illustrative purposes), which is of material advantage in assembling and disassembling the main valve in that the latter is accessible at all times and may be withdrawn from or inserted into the valve body without the necessity of disturbing the control and operating mechanism.

As will be seen from Fig. 2 in particular, a cylinder 18 is provided in the casting 16, and within this cylinder is a valve-operating and control rod 20. This rod projects to the exterior of the upper or outer end of the cylinder 18, where it is equipped with a handwheel 22. At its lower end the rod 20 carries a piston 32, and secured to this piston and extending through the lower end of the cylinder 18 and through and beyond the casting 24, mounted on the lower end of casting 16, is another rod 21, which is connected to the valve stem 14 through bell crank or rocker 26, pivoted at 28. The rod 20 is rotatable in the piston 32.

Intermediate its ends, the operating and control rod 20 is provided with an enlarged threaded portion 30. This may take the form of a spool keyed or otherwise rigidly secured to the rod 20, or it may be integral therewith, as desired.

The casting 16 is provided with a lateral extension 34, which is equipped with a cylinder 38, containing a locking piston 36. The piston 36 is spring-loaded by spring 40. The cylinder head is designated 42 and is in the form of a removable plug.

The locking piston 36 has an integral valve-locking extension 44, which projects toward and through the wall of the cylinder 18, and the inner end of this extension is threaded to engage the threaded portion 30 of the rod 20. The piston 36 has been termed a locking piston in that, when its locking extension 44 is in engagement with the threaded portion 30, the main valve 6 is locked against hydraulic operation. However, under these conditions, viz., with locking extension 44 intermeshed with portion 30 of the valve-operating and control rod 20, the main valve 6 can be opened and closed manually.

The control mechanism for hydraulic operation of the main valve 6 comprises two solenoids, a closing solenoid 46 and an opening solenoid 48. The two solenoids are set one above the other into a block 50, mounted on the face of the lateral extension 34 of the casting 16 or integral therewith. One of the solenoids is illustrated in Fig. 4.

The block 50, as shown at 52 in Fig. 4, is bored transversely in axial alignment with the solenoid 46, the block being provided with another identical bore (not shown) which is in axial alignment with the solenoid 48. In each of these bores is a valve element 54, shaped at 56 and 58 to provide two valve so spaced with respect to their respective seats that one valve will always be seated when the other is unseated. In addition, each of the valve elements 54 is provided with an axial bore 60, controlled by the tapered end of the solenoid core, which functions as a valve, as seen at 62.

With the solenoids de-energized, their respective cores are held by spring 64 in position to close the axial bore or port 60, as shown in Fig. 4. It will be seen from this same Fig. 4 that the end of each of the valve elements 56 adjacent its solenoid is enlarged in diameter with respect to the rest of the element, so as loosely to fit the bore 52 between the valve 56 and the solenoid core. The block 50 is provided with supply and exhaust ports 66 and 68, to which supply and exhaust lines 70 and 72 are connected. The supply line, it will be understood, is connected to any suitable source of pressure liquid, such as steam condensate or oil under pressure.

The block 50 is also drilled transversely of port 60, to provide ports 74 and 76, which connect the supply and exhaust ports 66 and 68 to the valve mechanism of the upper solenoid 48. This avoids the necessity of duplicating the supply and exhaust lines 70 and 72.

The block 50 is provided with ports 78 at each solenoid, the port 78 at the closing solenoid 46 being in constant communication with a drilled pressure supply and exhaust port 80 in the casting extension 34, which breaks through the cylinder 18 below the valve-operating piston 32. The port 78 at the solenoid 46 is also in constant communication with a drilled port 82 in casting 34, which breaks through the cylinder 38 behind the locking piston 36.

The port 78 at the upper solenoid 48 communicates with a drilled pressure supply and exhaust port 84 in casting 34, this port 84 breaking through the cylinder 18 above the valve-operating piston 32.

Each of the drilled supply and exhaust ports 80 and 84 is equipped with a throttling valve 86 for regulating the flow of pressure fluid through these ports. These valves are independently adjustable, and it will be appreciated that this will enable me to control the rate of opening and closing of the main valve to a nicety, thereby avoiding any abrupt movement of the valve in either direction. This feature also enables me readily to accommodate the mechanism to actuating liquids of widely varying viscosities, such as steam condensate on the one hand and oil on the other hand. The solenoids 46 and 48 are controlled from pushbuttons 88 and 90.

As the parts are shown in the drawings, the main valve 6 is in open position and locked against hydraulic operation by engagement of the extension 44 of the locking piston 36 with the threaded portion 30 of the valve-operating and control rod 20. In open position, the valve 6 is in balance, the by-pass valve 10 being open.

To close the main valve manually, it is merely necessary to turn the handwheel 22 clockwise, to raise the rod 20, this rod being threaded left-hand and engaging the threaded end of the extension 44 of the locking piston. This rise of the rod 20 will actuate the rocker 26 to close the by-pass valve 10 and move the main valve 6 in a closing direction, further rotation of the handwheel seating the main valve, as will be obvious.

To close the main valve hydraulically, it is merely necessary to close the pushbutton 90, thereby energizing the closing solenoid 46. This unseats the valve 62, carried at the end of the core of this solenoid, to uncover the port 60 of the two-valve element 54, so that the latter, which previously had been maintained closed by the pressure fluid seeping past the enlarged end of element 54, will be unbalanced and will move to the left, as viewed in Fig. 4. This movement of the element 54 to the left will unseat valve 56 and seat 58, so that pressure fluid can flow from supply port 66 to port 78, and, port 78 always being in communication with port 80 (Fig. 2), pressure fluid will be admitted to the cylinder 18 below the valve-operating piston 32 and, at the same time, pressure fluid will be admitted to drilled port 82 to apply pressure to the control piston 36, causing the same to be retracted, as viewed in Fig. 2, so that the extension 44 thereof is moved out of contact with the threaded portion 30 of the valve-operating and control rod 20. The valve-operating piston 32, together with the rod 20, no longer being locked against hydraulic operation, will move upwardly in the same fashion as when the handwheel 22 is operated, as above described. Upon release of the pushbutton with resultant opening of the circuit of solenoid 46, the solenoid valve 62 will close under the action of its spring 64, so that element 54 will again resume the position shown in Fig. 4. Inasmuch as the exhaust valve 58 of the element 54 of the solenoid 46 is now open, the pressure fluid in the cylinder 38 is free to be exhausted through 68, permitting the locking piston 36 to assume the position shown in Fig. 2 to lock the valve-operating and control rod 20 in closed-valve position against hydraulic operation. It will be understood that the pushbutton 90 may be released before the valve 6 is closed, in which event movement of the valve 6 toward closed position will cease.

It will be appreciated that, in opening the valve 6 hydraulically, the pushbutton 88 is operated to energize the opening solenoid 48. As above explained, this is a duplicate of the construction shown in Fig. 4. The solenoid 46 being de-energized, the parts therein are in the position shown in Fig. 4, but upon energization of solenoid 48, pressure fluid is free to move through port 74 to the port 78 of solenoid 48 and from thence to drilled port 84, leading to the cylinder 18 above the valve-operating piston 32. The end of the extension 44 of the locking piston 36 is thus subjected to the pressure in cylinder 18, thereby to unlock the rod 20, so that the same may be moved hydraulically inwardly of the cylinder 18 to open the main valve 6. It will be appreciated on this opening movement that, if the pushbutton 88 is released before valve 6 is fully opened, the solenoid 48 will be de-energized and all movement of the valve will cease.

As above pointed out, the drilled ports 80 and 84 are equipped with throttling valves 86, which are set initially to correspond to the valve opening and closing rate desired. For example, it may be desirable to have the valve 6 close slowly, in which event the valves 86 will be partially closed. This, it will be appreciated, may readily be accomplished by setting the throttling valve 86 to restrict the port 84, this port functioning as an exhaust port in closing the valve; also that, by setting the valve 86 to restrict the port 80, the opening movement of the valve may be regulated. It will be appreciated also that the provision of the throttling valves facilitates accommodating the mechanism to liquids of various viscosities.

In addition to the advantages of the electrically controlled hydraulic operation, just described, over direct driven, geared-motor operated valves as conventionally constructed, it will be seen, as heretofore pointed out, that, by mounting the control and operation mechanism at an angle to each other, as clearly illustrated in Fig. 3, ready access is had to the main valve 6 for any purpose desired. This is of material advantage also in re-assembling the valve.

Figure 5:
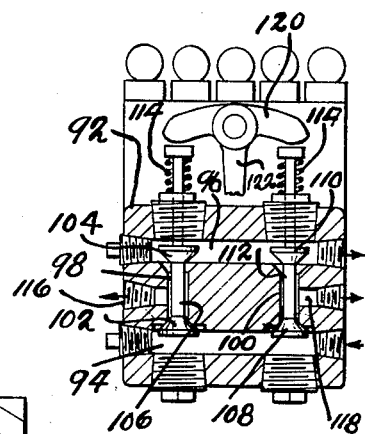
Fig. 5 is a framentary sectional view illustrating hydraulic control for the valve rather than electrical.

If desired, the control mechanism may be hydraulic instead of electric. In Fig. 5, I have illustrated such hydraulic mechanism, which, it is to be understood, will replace the solenoid mechanism above described.

In this construction, a block 92 will replace 50 of Fig. 4. This block is bored transversely to provide pressure supply port 94 and discharge 96, which, it will be appreciated, are connected to supply line 70 and exhaust 72.

These ports are cross-connected, that is, connected in parallel by ports 98 and 100. The two ends of each of these ports are controlled by a spring-loaded valve, each pair of valves having a common stem. Thus, the port 98 is controlled by a valve 102 at the supply port 94 and by a valve 104 at the discharge port 96, these two valves having a common stem 106. The port 100 is equipped with similar valves 108 and 110 at opposite ends of a common stem 112.

The two stems 106 and 112 extend to the exterior of the block 92. The loading springs for the control valves are designated 114 and normally maintain the pressure valves 102 and 108 closed and discharge valves 104 and 110 open, as shown in Fig. 5.

The cross port 98 is connected at all times to the ports 80 and 82 of Fig. 2 (see port 116 of Fig. 5) and cross port 100 is connected at all times to the port 84 of Fig. 2 (see port 118 of Fig. 5).

To operate this mechanism, I provide a rocker 120, pivoted at its middle and rocked by a handle 122.

To close the main valve 6, it is merely necessary to tip the rocker 120 until one end engages the extension of valve stem 106, pushing the stem downwardly against the action of its loading spring until pressure valve 102 is full open and discharge valve 104 is closed. Pressure supply port 94 is now open, so that pressure fluid can flow by way of port 116 to ports 80 and 82 in casting extension 34 of Fig. 2 to unlock the rod 20 and raise the same, as explained in connection with the electric control mechanism. Upon again centering the rocker 120, the parts will assume the position shown in Fig. 5, under which condition exhaust valve 104 is open, releasing pressure in cylinder 18, so that locking piston 36 will lock rod 20 in closed-valve position. For opening the valve 6, rocker 120 will be tipped in the opposite direction to open pressure valve 108, to admit pressure fluid to port 84 of Fig. 2 and retract locking piston 36, as explained in connection with the electric control mechanism of Fig. 4.

Figure 6:
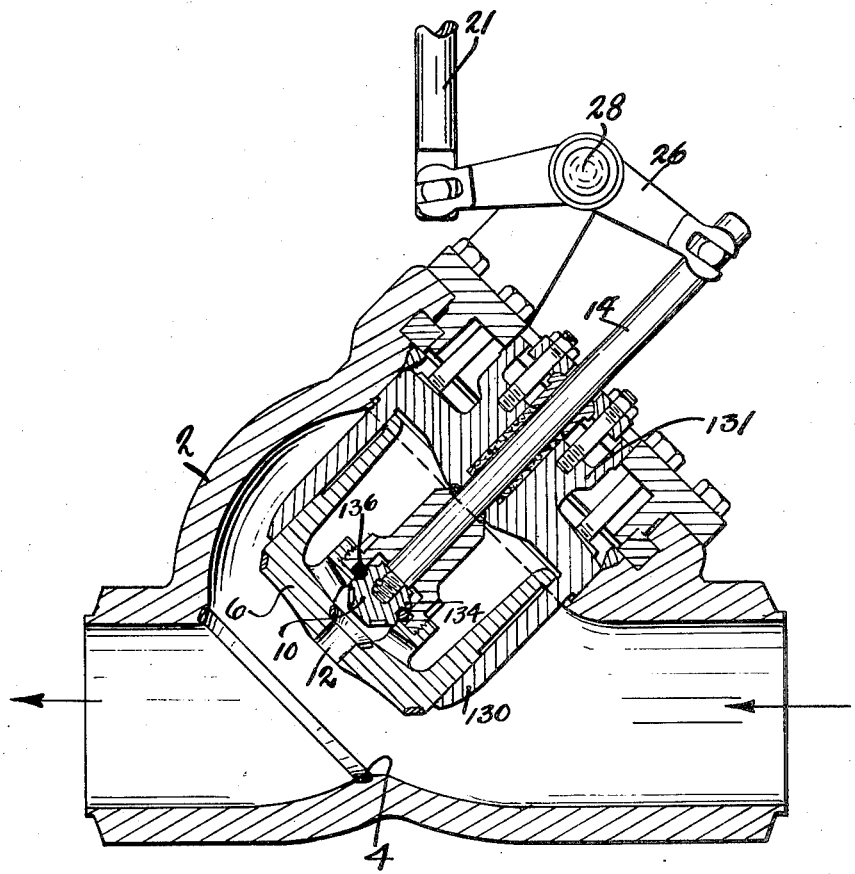
Fig. 6 is a sectional view of the main valve altered in construction as compared with the showing in Fig. 3.

The construction shown in Fig. 6 illustrates a modification of the main valve construction. In this embodiment of the invention, the valve body 2 approximates a true sphere and, hence, provides exceptionally generous steam passage and easy approach and exit flow lines and ideal metal distribution.

To facilitate manufacture, the valve 6 in this embodiment, as distinguished from the showing in Fig. 3, operates in a cylinder 130, which is separate from the valve body 2; this valve cylinder is a nickel-alloy, corrosion-resistant casting, integral with the main thrust load portion 131.

The by-pass valve 10 is provided with a continuous circumferential shoulder 134, which cooperates with a split ring 136 surrounding the valve. In Fig. 6, the valve 10 is shown open, and it will be apparent that the ring 136 will lock it in this position. In closing the by-pass valve 10, the shoulder 134 is forced past the ring, so that it will then lie above the shoulder to hold the valve closed.

In addition to the foregoing, it will be seen from Fig. 6 that, because the valve-operating structure is set at an angle to the valve assembly, the latter can be easily withdrawn from or inserted into the valve body without disturbing the operating and control mechanism.

As brought out in the beginning of this description, I employ pressure liquid for opening and closing the main valve hydraulically, this pressure liquid may be steam condensate, oil, or other liquid, depending upon conditions at a given installation.

It will be understood also that the pressure liquid may be taken from any convenient source, and that the control mechanism, that is to say, the solenoid valves illustrated in Fig. 4 or the hydraulic control illustrated in Fig. 5, may be mounted on the casting 16 or may be located remote from the casting, depending upon circumstances. Of course, the pushbuttons by which the solenoids are controlled may be located wherever convenient.

In Fig. 7 I have illustrated a construction in which the necessity for a reservoir for the operating liquid has been eliminated. In this contruction I may still employ, for example, the electrical control of Fig. 1 and Fig. 4, but the hydraulic operating system is initially filled with a liquid, which is only placed under pressure when the main valve is to be operated.

For this purpose I mount a small electrically driven gear pump 140 on the housing of the hydraulic operating mechanism. The casting 34 is bored to provide ports 142, 144 and 146, corresponding respectively to ports 80, 82 and 84 of Fig. 2, and 148 and 150 correspond to the solenoids 46 and 48 of Fig. 2. Port 152 at the pressure side of the gear pump corresponds to pressure supply line 70 of Fig. 2, while port 154 at the other side of the pump corresponds to the exhaust line 72 of Fig. 2.

The operation of this equipment is obvious, so that a detailed description seems to be unnecessary. Normally, the system is full of oil or other liquid. To open or close the main valve, it is merely necessary to close the button 88 or 90, as the case may be, which not only closes the circuit to the corresponding solenoid 148 or 150 but will close the circuit to the motor for the gear pump. Almost instantly, pressure will be built up in the operating fluid, due to operation of the pump, and the main valve will then be opened or closed, as the case may be, as described in connection with Figs. 1 to 4, for example. Upon release of the pushbutton, the pump circuit will be opened, so that the pump will cease operating, the solenoid circuit will be opened and initial conditions restored, so far as liquid pressure and liquid movement and valve locking are concerned.

Figure 8:
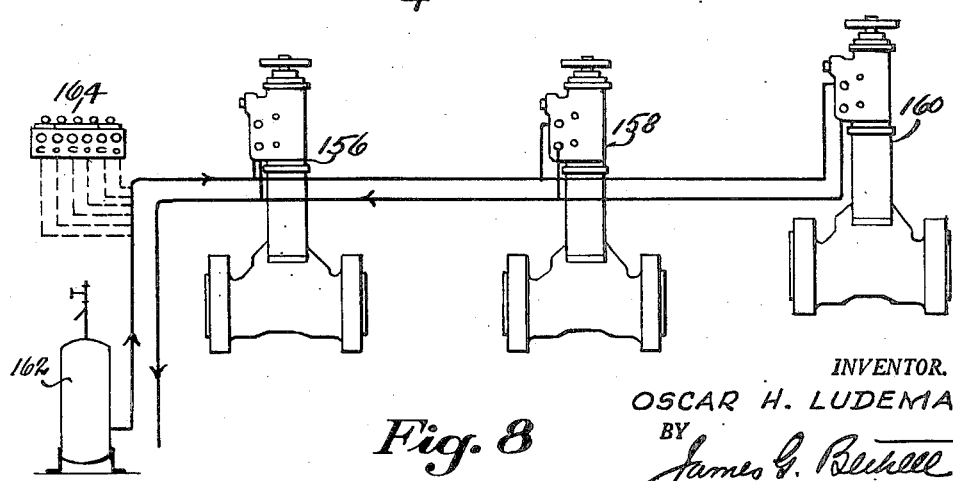
Fig. 8 is a more or less diagrammatic view of still another embodiment of the invention.

In Fig. 8 I have illustrated schematically an arrangement whereby a bank of valves can be selectively controlled and operated from a central station.

In this embodiment of my invention I provide a plurality of valves and valve-operating mechanisms, each of which is a duplicate of Figs. 1 to 4, for example. The several units are designated 156, 158, and 160, respectively. 162 designates a pressure liquid supply or reservoir. The three valve units are connected to the supply in parallel. 164 designates a bank of pushbuttons, a pair of buttons for each valve unit. By this arrangement, it will be quite apparent, the valve units may be operated selectively from the button panel 164.

While I have described several embodiments of my invention, it is to be understood that variations may be made in the details of construction and arrangement of parts shown and described within the purview of my invention.

What I claim is:

1. Valve mechanism comprising, in combination, a valve and a valve body; a stem for said valve; a valve-operating rod; a connection between said rod and the valve stem, whereby longitudinal movement of the said rod will actuate said valve; a piston carried by said rod; a ported cylinder for said piston, a pressure liquid for driving said piston, to effect selective longitudinal movement of said rod; a threaded area on said rod; and a non-rotatable, hydraulically actuated threaded element adapted to engage said threaded area to lock said rod against longitudinal movement by said pressure liquid, and means for manually rotating said rod with said threaded element in the said locking position in mesh with the threaded area of the rod to effect longitudinal movement of the rod and corresponding movement of the valve.

2. Valve mechanism comprising, in combination, a valve; a housing therefor; and hydraulic valve-operating mechanism and control mechanism therefor carried by said valve housing, said valve-operating mechanism comprising a cylinder, a piston therein operatively connected to said valve, a pair of control valves, ports for pressure liquid communicating with said cylinder at each side of said piston, said ports being controlled by said control valves selectively, locking means for locking the piston against movement, and hydraulically operated retracting means for retracting the said locking means to inoperative position, said retracting means comprising a piston attached to the locking means, a cylinder therefor, and a port in said cylinder for pressure liquid, said port being selectively controlled by said control valves, whereby the said locking means will be rendered ineffective upon the opening of either of said control valves.

3. Valve mechanism comprising, in combination, a valve; a housing therefor; and hydraulic valve-operating mechanism and control mechanism therefor carried by said housing, said valve-operating and control mechanisms being mounted on the valve housing at an angle thereto, to leave the housing end unobstructed, whereby the valve assembly may be withdrawn from the housing without dismounting the operating and control mechanisms; the valve-operating mechanism comprising a cylinder, a piston therein, a rod attached to said piston and extending to the exterior of said cylinder, a rocker arm attached at one end to said rod and at its other end to the stem of said valve, a second rod in said cylinder, the said second rod being rotatably attached at its inner end to said piston, its outer end projecting through the top of said cylinder to be accessible for manual actuation, said second rod between the piston and the top of said cylinder being provided with a threaded area, a locking element extending normally to the axis of the second rod and projecting through the side of said cylinder, the inner end of said locking element being threaded and engaging the threaded area of said second rod, whereby rotation of this rod will cause the rod to move axially thereby to actuate said valve; said control means comprising a pair of control valves selectively operable, pressure liquid ports communicating with said cylinder at each side of said piston, said ports being controlled by said control valves, and another pressure liquid port controlled by said control valves for permitting the pressure liquid to retract said locking element when either of said control valves is opened, thereby to unlock said second rod for hydraulic operation of the main valve.

4. Valve mechanism comprising, in combination, a valve; a housing therefor; and hydraulic valve-operating mechanism and control mechanism therefor mounted on said housing; the said operating mechanism comprising a cylinder and a piston therein, the latter being attached to said valve; said operating mechanism also comprising an electric driven pump and ports leading therefrom to said cylinder at each side of said piston, a liquid filling said ports and cylinder at all times; a pair of solenoid valves for controlling said ports selectively, a switch for each solenoid valve, each switch, when closed, closing the circuit for said pump so that upon closure of the switch for either valve the pump will build up pressure in the liquid and the main valve will be operated in a direction corresponding to the operated solenoid valve.

References Cited in the file of this patent

UNITED STATES PATENTS

| Number | Name | Date |
| --- | --- | --- |
| 677,940 | Carr | July 9, 1901 |
| 1,132,570 | Fivey | Mar. 23, 1915 |
| 1,307,450 | Morton | June 24, 1919 |
| 1,648,710 | Wright | Nov. 8, 1927 |
| 1,929,867 | Hall | Oct. 10, 1933 |
| 2,320,011 | Reynolds | May 25, 1943 |
| 2,335,143 | Dahl | Nov. 23, 1943 |
| 2,473,013 | Crane | June 14, 1949 |
| 2,496,740 | Morey | Feb. 7, 1950 |
| 2,601,578 | Witt | June 24, 1952 |
| 2,630,785 | Ray | Mar. 10, 1953 |